(12) United States Patent
Li et al.

(10) Patent No.: US 11,746,869 B2
(45) Date of Patent: *Sep. 5, 2023

(54) TORQUE CONVERTER ASSEMBLIES WITH INTEGRATED PLANETARY-TYPE TORSIONAL VIBRATION DAMPERS

(71) Applicant: GM GLOBAL TECHNOLOGY OPERATIONS LLC, Detroit, MI (US)

(72) Inventors: Dongxu Li, Troy, MI (US); Leonid Basin, Farmington Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 38 days.

This patent is subject to a terminal disclaimer.

(21) Appl. No.: 17/557,506

(22) Filed: Dec. 21, 2021

(65) Prior Publication Data

US 2022/0112943 A1    Apr. 14, 2022

Related U.S. Application Data

(62) Division of application No. 16/702,679, filed on Dec. 4, 2019, now Pat. No. 11,242,920.

(51) Int. Cl.
*F16H 45/02* (2006.01)

(52) U.S. Cl.
CPC ..... *F16H 45/02* (2013.01); *F16H 2045/0215* (2013.01); *F16H 2045/0268* (2013.01)

(58) Field of Classification Search
CPC ............. F16H 45/02; F16H 2045/0268; F16H 2045/0226; F16H 2045/0231; F16H 2045/0294

See application file for complete search history.

(56) References Cited

U.S. PATENT DOCUMENTS

| | | | |
|---|---|---|---|
| 4,018,106 A * | 4/1977 | Uozumi | F16H 3/663 475/47 |
| 9,500,259 B1 * | 11/2016 | Bai | F16F 15/1206 |
| 11,242,920 B2 * | 2/2022 | Li | F16H 45/02 |
| 11,448,279 B2 * | 9/2022 | Yin | F16F 1/48 |
| 2015/0308540 A1 * | 10/2015 | Lorenz | F16F 15/1478 464/68.1 |

* cited by examiner

*Primary Examiner* — Huan Le
(74) *Attorney, Agent, or Firm* — Quinn IP Law

(57) ABSTRACT

Presented are torque converters (TC) with planetary-type vibration dampers, methods for making/using such TC assemblies, and vehicles equipped with such TC assemblies. A TC assembly includes a TC housing drivingly connected to a prime mover to receive torque therefrom, and a TC output member drivingly connected to a transmission to transfer torque thereto. Rotatably mounted within an internal fluid chamber of the TC housing are juxtaposed turbine and impeller blades. The impeller blades are rotatably mounted to the housing. A TC clutch is operable to lock the TC housing to the TC output member. A torsional vibration damper, which is disposed within the internal fluid chamber, includes a sun gear attached to the TC output member for unitary rotation, a ring gear attached to the TC clutch for unitary rotation, and a planet carrier intermeshed with the ring and sun gears and attached to the turbine blades for unitary rotation.

20 Claims, 2 Drawing Sheets

TORQUE CONVERTER ASSEMBLIES WITH INTEGRATED PLANETARY-TYPE TORSIONAL VIBRATION DAMPERS

CLAIM OF PRIORITY AND CROSS-REFERENCE TO RELATED APPLICATION

This application is a divisional of U.S. patent application Ser. No. 16/702,679, which was filed on Dec. 4, 2019, is now allowed, and is incorporated herein by reference in its entirety and for all purposes.

INTRODUCTION

The present disclosure relates generally to powertrain systems for transmitting torque. More specifically, aspects of this disclosure relate to torsional damper assemblies for hydrodynamic torque converters of motor vehicle powertrains.

Current production motor vehicles, such as the modern-day automobile, are originally equipped with a powertrain that operates to propel the vehicle and power the vehicle's onboard electronics. In automotive applications, for example, the vehicle powertrain is generally typified by a prime mover that delivers driving power through an automatic or manually shifted power transmission to the vehicle's final drive system (e.g., differential, axle shafts, road wheels, etc.). Automobiles have historically been powered by a reciprocating-piston type internal combustion engine (ICE) assembly due to its ready availability and relatively inexpensive cost, light weight, and overall efficiency. Such engines include compression-ignited (CI) diesel engines, spark-ignited (SI) gasoline engines, two, four, and six-stroke architectures, and rotary engines, as some non-limiting examples. Hybrid electric and full electric vehicles, on the other hand, utilize alternative power sources to propel the vehicle and, thus, minimize or eliminate reliance on a fossil-fuel based engine for tractive power.

A full electric vehicle (FEV)—colloquially branded as an "electric car"—is a type of electric-drive vehicle configuration that altogether removes the internal combustion engine and attendant peripheral components from the powertrain system, relying solely on electric traction motors for propulsion and for supporting accessory loads. The engine assembly, fuel supply system, and exhaust system of an ICE-based vehicle are replaced with a single or multiple traction motors, a traction battery back, and battery cooling and charging hardware in an FEV. Hybrid electric vehicle (HEV) powertrains, in contrast, employ multiple sources of tractive power to propel the vehicle, most commonly operating an internal combustion engine assembly in conjunction with a battery-powered or fuel-cell-powered electric traction motor. Since hybrid-type, electric-drive vehicles are able to derive their power from sources other than the engine, hybrid electric vehicle engines may be turned off, in whole or in part, while the vehicle is propelled by the electric motor(s).

Vehicle powertrains employing an automatic transmission commonly insert a hydrodynamic torque converter between the internal combustion engine and the multi-speed transmission to govern the transfer of rotational power therebetween. Torque converters are designed to selectively transmit power from the engine to the drivetrain system for vehicle propulsion, and to allow the crankshaft to spin without the engine stalling when the vehicle wheels and transmission gears come to a stop. Replacing the mechanical clutch of a manual transmission, a standard torque converter (TC) acts as a fluid coupling with an impeller that is drivingly connected to the engine's crankshaft, and a turbine that is drivingly connected to the transmission's input shaft. Interposed between the impeller and turbine is a stator that regulates fluid flow between their respective fluid volumes. A hydraulic pump modulates fluid pressure within the torque converter housing to modulate the amount of rotational energy transferred from the impeller to the turbine. A large difference in speed between the impeller and turbine results in torque multiplication of the impeller torque, as for example when the vehicle is accelerating from rest with the engine running.

Most modern torque converter assemblies are equipped with an internal "lockup" clutch mechanism that is actively engaged to rigidly connect the engine's crankshaft to the transmission's input shaft when their speeds are nearly equal, e.g., to avoid unwanted slippage and resultant efficiency losses. System "slip" occurs because the rotational speed of the impeller relative to the rotational speed of the turbine in the torque converter are inherently different. A large slip percentage between the engine output and transmission input affects the fuel economy of the vehicle; employing a torque converter clutch (TCC) helps to significantly reduce unwanted slip. The TCC operates to mechanically lock the impeller at the output of the engine to the turbine at the input of the transmission so that the engine output and transmission input rotate at the same speed. Application of the TCC may be controlled by a powertrain control module (PCM) to modify clutch engaging forces under certain operating conditions, for example, during clutch-to-clutch shifts to eliminate undesired torque fluctuations and engine speed changes during transient periods when torque flow interruption is desired. A torsional isolating damper may be employed to attenuate torque-related vibrations transmitted between the engine and the transmission during TCC lockup.

SUMMARY

Presented herein are torque converter assemblies with integrated planetary-type torsional vibration dampers, torque-transmitting powertrains equipped with such TC assemblies, methods for making and methods for using such TC assemblies, and motor vehicles equipped with such TC assemblies. By way of example, there are presented hydrodynamic torque converters with an engine-driven impeller fluidly coupled to a transmission-driving turbine, and a torque-multiplying stator interposed between the impeller and turbine. Also packaged inside the TC housing's internal fluid volume is a TCC lockup clutch that rotatably locks the housing's front cover and, thus, the engine's crankshaft to the TC turbine shaft and, thus, the transmission's input shaft. Sandwiched between the lockup clutch and fluid-coupled turbine and impeller is a planetary-type torsional vibration damper. The damper includes a planetary gear set with an outer ring gear that is concentrically aligned with a central sun gear. Mounted onto a planet carrier are circumferentially spaced pinion-type "planet" gears that are intermeshed with the ring gear and sun gear. The ring gear is securely attached, e.g., via interconnecting ring drive plate, to the TCC to rotate in unison therewith, while the planet carrier is securely attached, e.g., via interconnecting carrier drive plate, to the turbine shell to rotate in unison therewith. The sun gear is securely attached, e.g., via intermeshed spline teeth, to the turbine shaft to rotate in unison therewith. Circumferentially spaced compression springs, which are carried by a dedicated spring retainer disc, mate the planet carrier with the ring gear.

Attendant benefits for at least some of the disclosed concepts may include hydrodynamic torque converter assemblies with a fully integrated torsional damper assembly that helps to isolate and diminish torque swings and vibrational excitation to minimize vehicle noise, vibration and harshness (NVH) that can result during key engine operating points. Aspects of the disclosed concepts also help to reduce the impact velocity and other related effects of torque changes on a torque converter assembly. Disclosed damper assembly designs may also reduce the required travel of the damping elements so as to minimize the overall size and requisite packaging space for the damper assembly. Disclosed torque converter and damper assemblies can be incorporated into both standard and electric-drive vehicle architectures, as well as non-automotive applications. Other attendant benefits may include reduced part costs and manufacturing complexity.

Aspects of this disclosure are directed to hydrodynamic torque converter assemblies with integrated planetary-type dampers for isolating and mitigating torsional vibrations transferred through a torque-transmitting powertrain. In an example, a torque converter assembly is presented that includes a TC housing that drivingly connects (e.g., via lugs, lug plate and flex plate) to the output member of a prime mover (e.g., engine and/or motor) to receive torque generated by the prime mover. A TC output member, such as a central turbine shaft, projects from the TC housing and drivingly connects to the input member of a transmission, such as an input gear, to transfer thereto engine-generated torque. Rotatably mounted within an internal fluid chamber of the TC housing is a turbine with turbine blades and an impeller with impeller blades. The impeller blades are juxtaposed with the turbine blades and rotatably mounted to the TC housing.

Continuing with the discussion of the above example, the torque converter assembly also includes a TC lockup clutch, e.g., of the wet friction type, that is disposed within the TC's internal fluid chamber and operable to selectively lock the TC housing to the TC output member. Integrated with the TC assembly is a torsional vibration damper that is located inside the internal fluid chamber, disposed between the turbine and the TC clutch. The torsional vibration damper includes a planetary gear set with a sun gear, a ring gear, and a planet carrier. The sun gear is concentric with and rotatably locked or otherwise securely attached to the TC output member for common rotation therewith. By comparison, the ring gear is coaxial with the sun gear and rotatably locked or otherwise securely attached to the TC clutch for common rotation therewith. The planet carrier, which is coaxial with both the sun and ring gears, bears one or more pinion gears that intermesh with the ring and sun gears. The planet carrier is rotatably locked or otherwise securely attached to the turbine blades for common rotation therewith.

Additional aspects of this disclosure are directed to motor vehicles equipped with TC assemblies integrated with planetary-type torsional vibration dampers. As used herein, the terms "vehicle" and "motor vehicle" may be used interchangeably and synonymously to include any relevant vehicle platform, such as passenger vehicles (ICE, REV, FEV, fuel cell, fully and partially autonomous, etc.), commercial vehicles, industrial vehicles, tracked vehicles, off-road and all-terrain vehicles (ATV), motorcycles, farm equipment, watercraft, aircraft, etc. In an example, a motor vehicle includes a vehicle body with multiple road wheels and other standard original equipment. An internal combustion engine assembly is mounted on the vehicle body and operates alone (e.g., for standard powertrains) or in conjunction with one or more traction motors (e.g., for HEV powertrains) to drive one or more of the road wheels to thereby propel the vehicle.

Continuing with the discussion of the above example, the vehicle also includes a multi-speed power transmission that is mounted to the vehicle body and includes a transmission input shaft that drivingly connects to the engine, and a transmission output shaft that drivingly connects to one or more of the road wheels. A torque converter operatively connects the ICE assembly to the power transmission. This TC assembly includes a TC housing that is drivingly connected to the engine's crankshaft to thereby receive torque generated by the ICE assembly. A turbine shaft projects from the TC housing and drivingly connects to the transmission's input shaft to thereby transfer torque to the power transmission. A turbine with turbine blades is rotatably mounted within the TC housing's internal fluid chamber. Likewise, impeller blades of an impeller are juxtaposed with the turbine blades and rotatably mounted to the TC housing within the internal fluid chamber. A TC clutch is operable to lock the TC housing to the turbine shaft. Disposed within the internal fluid chamber, interposed between the turbine and the TC clutch, is a torsional vibration damper. The torsional vibration damper includes: a sun gear that is attached to the turbine shaft for unitary rotation; a ring gear that is concentric with the sun gear and attached to the TC clutch for unitary rotation; and, a planet carrier that is coaxial with the sun and ring gears, bears multiple pinion gears intermeshed with the ring and sun gears, and is attached to the turbine blades for unitary rotation.

Also presented herein are methods for manufacturing and methods for operating any of the disclosed torque converter assemblies, powertrains, and/or motor vehicles. In an example, a method is presented for assembling a torque converter assembly for drivingly connecting a prime mover with a transmission. This representative method includes, in any order and in any combination with any of the above and below disclosed options and features: receiving a torque converter housing configured to drivingly connect to the output member of a prime mover to thereby receive torque generated by the prime mover; positioning a TC output member to project from an internal fluid chamber within the TC housing, the TC output member being configured to drivingly connect to the input member of a transmission to thereby transfer torque to the transmission; rotatably mounting turbine blades of a turbine within the internal fluid chamber; rotatably mounting impeller blades of an impeller to the TC housing within the internal fluid chamber such that the impeller blades are juxtaposed with the turbine blades; positioning a TC clutch within the internal fluid chamber, the TC clutch being operable to lock the TC housing to the TC output member; positioning a torsional vibration damper within the internal fluid chamber between the turbine and the TC clutch, the torsional vibration damper including a sun gear, a ring gear coaxial with the sun gear, and a planet carrier bearing a pinion gear intermeshed with the ring and sun gears; attaching the sun gear to the TC output member for common rotation therewith; attaching the ring gear to the TC clutch for common rotation therewith; and attaching the planet carrier to the turbine blades for common rotation therewith.

Attaching the planet carrier to the turbine blades in the above methodology may include coupling the planet carrier to a bladed turbine shell via a carrier drive plate. As yet a further option, coupling the planet carrier to the turbine shell in the above methodology may include inserting a carrier tab projecting axially from the carrier drive plate into the slot of an adapter ring projecting radially outward from the turbine shell. The method may also include rotatably mounting the turbine shell onto a toroidal hub of the sun gear via a turbine hub. Moreover, the method may further comprise mating a carrier drive plate-mounted spring retainer with a TC friction plate of the TC clutch via a spring element such that the planet carrier is movably attached to the TC clutch. Attaching the ring gear to the TC clutch in the above methodology may include coupling the ring gear to the friction plate via a ring drive plate.

The above summary is not intended to represent every embodiment or every aspect of the present disclosure. Rather, the foregoing summary merely provides an exemplification of some of the novel concepts and features set forth herein. The above features and advantages, and other features and attendant advantages of this disclosure, will be readily apparent from the following detailed description of illustrated examples and representative modes for carrying out the present disclosure when taken in connection with the accompanying drawings and the appended claims. Moreover, this disclosure expressly includes any and all combinations and subcombinations of the elements and features presented above and below.

Figure 1:
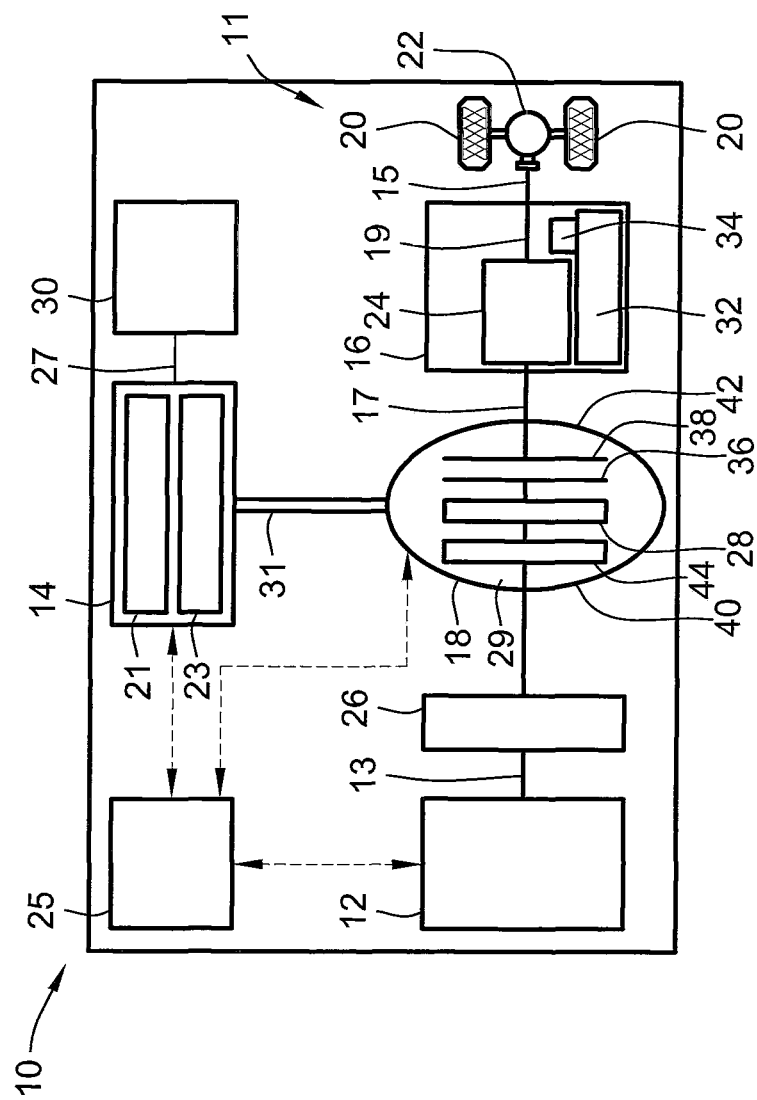
FIG. 1 is a schematic illustration of a representative motor vehicle with a powertrain having a final drive system drivingly connected to an engine assembly and a traction motor by a torque converter assembly and multi-speed power transmission in accordance with aspects of the present disclosure.

The present disclosure is amenable to various modifications and alternative forms, and some representative embodiments are shown by way of example in the drawings and will be described in detail herein. It should be understood, however, that the novel aspects of this disclosure are not limited to the particular forms illustrated in the above-enumerated drawings. Rather, the disclosure is to cover all modifications, equivalents, combinations, subcombinations, permutations, groupings, and alternatives falling within the scope of this disclosure as encompassed, for example, by the appended claims.

DETAILED DESCRIPTION

This disclosure is susceptible of embodiment in many different forms. Representative embodiments of the disclosure are shown in the drawings and will herein be described in detail with the understanding that these embodiments are provided as an exemplification of the disclosed principles, not limitations of the broad aspects of the disclosure. To that extent, elements and limitations that are described, for example, in the Abstract, Introduction, Summary, and Detailed Description sections, but not explicitly set forth in the claims, should not be incorporated into the claims, singly or collectively, by implication, inference or otherwise.

For purposes of the present detailed description, unless specifically disclaimed: the singular includes the plural and vice versa; the words "and" and "or" shall be both conjunctive and disjunctive; the words "any" and "all" shall both mean "any and all"; and the words "including," "containing," "comprising," "having," and the like, shall each mean "including without limitation." Moreover, words of approximation, such as "about," "almost," "substantially," "generally," "approximately," and the like, may each be used herein in the sense of "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a motor vehicle, such as a forward driving direction of a motor vehicle, when the vehicle is operatively oriented on a horizontal driving surface.

Referring now to the drawings, wherein like reference numbers refer to like features throughout the several views, there is shown in FIG. 1 a schematic illustration of a representative automobile, which is designated generally at 10 and portrayed herein for purposes of discussion as a passenger vehicle with a parallel two-clutch (P2) hybrid-electric powertrain. In particular, the illustrated powertrain is generally composed of a single engine 12 and a single motor 14 that operate, individually and in concert, to transmit tractive power to a multi-speed power transmission 16 through a hydrokinetic torque converter (TC) assembly 18 to drive one or more road wheels 20 of the vehicle's final drive system 11. The illustrated automobile 10—also referred to herein as "motor vehicle" or "vehicle" for short—is merely an exemplary application with which aspects and features of this disclosure may be practiced. In the same vein, implementation of the present concepts into a P2 hybrid powertrain should also be appreciated as an exemplary application of the novel concepts disclosed herein. As such, it will be understood that aspects and features of the present disclosure can be applied to other vehicle powertrain configurations and utilized for any logically relevant type of motor vehicle. Moreover, the schematic illustration of FIG. 1 is not per se representative of the actual mechanical connection points between the interconnected powertrain components presented therein. Lastly, only select components have been shown and will be described in additional detail herein. Nevertheless, the vehicles, powertrains, and torque converters discussed below can include numerous additional and alternative features, and other available peripheral components, e.g., for carrying out the various methods and functions of this disclosure.

The representative vehicle powertrain system is shown in FIG. 1 with a prime mover—represented herein by a restartable internal combustion engine (ICE) assembly 12 and an electric motor/generator unit 14—that is drivingly connected to a driveshaft 15 of a final drive system 11 by an automatic power transmission 16. The engine 12 transfers power, preferably by way of torque via an engine crankshaft 13 ("engine output member"), to an input side of the transmission 16. According to the illustrated example, the ICE assembly 12 rotates an engine disconnect device 26, an engine-driven torsional damper assembly 28, and a lockup-type torque converter clutch 44. When operatively engaged, this engine disconnect device 26 transmits torque received from the ICE assembly 12 to the TC assembly 18. The transmission 16, in turn, is adapted to receive, selectively manipulate, and distribute tractive power from the engine 12 and motor 14 to the vehicle's final drive system 11—represented herein by a driveshaft 15, rear differential 22, and a pair of rear road wheels 20—and thereby propel the hybrid vehicle 10. The power transmission 16 and TC assembly 18 of FIG. 1 may share a common transmission oil pan or "sump" 32 for supply of hydraulic fluid, as well as a shared transmission pump 34 for sufficient hydraulic pressure to activate the elements of the transmission 16 and TC assembly 18, including the integrated torsional damper assembly 28 and lockup clutch 44.

The ICE assembly 12 operates to propel the vehicle 10 independently of the electric traction motor 14, e.g., in an "engine-only" operating mode, or in cooperation with the motor 14, e.g., in a "motor-boost" operating mode. In the example depicted in FIG. 1, the ICE assembly 12 may be any available or hereafter developed engine, such as a compression-ignited diesel engine or a spark-ignited gasoline or flex-fuel engine, which is readily adapted to provide its available power output typically at a number of revolutions per minute (RPM). Although not explicitly portrayed in FIG. 1, it should be appreciated that the final drive system 11 may take on any available configuration, including front wheel drive (FWD) layouts, rear wheel drive (RWD) layouts, four-wheel drive (4WD) layouts, all-wheel drive (AWD) layouts, six-by-four (6×4) layouts, etc.

FIG. 1 also depicts an electric motor/generator unit 14 or other suitable traction motor that operatively connects via a motor support hub, shaft, or belt 31 ("motor output member") to torque converter assembly 18, and via TC assembly 18 to an input shaft or gear 17 ("transmission input member") of the transmission 16. The motor/generator unit 14 may be directly coupled onto a TC input shaft or drivingly mounted to a housing portion of the torque converter 18. The electric motor/generator unit 14 is composed of an annular stator 21 circumscribing and concentric with a rotor 23. Electric power is provided to the stator 21 through electrical conductors or cables 27 that pass through the motor housing in suitable sealing and insulating feedthroughs (not illustrated). Conversely, electric power may be provided from the MGU 14 to an onboard traction battery pack 30, e.g., through regenerative braking. Operation of any of the illustrated powertrain components may be governed by an onboard or remote vehicle controller, such as programmable electronic control unit (ECU) 25. While shown as a P2 hybrid-electric architecture with a single motor in parallel power-flow communication with a single engine assembly, the vehicle 10 may employ other powertrain configurations, including PS, P1, P3, and P4 hybrid powertrains, as well as standard and full-electric vehicle architectures.

Power transmission 16 may use differential gearing 24 to achieve selectively variable torque and speed ratios between the transmission's input and output shafts 17 and 19, respectively, e.g., while sending all or a fraction of its power through the variable elements. One form of differential gearing is the epicyclic planetary gear arrangement. Planetary gearing offers the advantage of compactness and different torque and speed ratios among all members of the planetary gearing subset. Traditionally, hydraulically actuated torque establishing devices, such as clutches and brakes (the term "clutch" used to reference both clutches and brakes), are selectively engageable to activate the aforementioned gear elements for establishing desired forward and reverse speed ratios between the transmission's input and output shafts. While envisioned as a 6-speed automatic transmission, the power transmission 16 may optionally take on other suitable configurations, including Continuously Variable Transmission (CVT) architectures, automated-manual transmissions, etc.

As indicated above, ECU 25 is constructed and programmed to govern, among other things, operation of the engine 12, motor 14, transmission 16, TC assembly 18, engine disconnect device 26, damper assembly 28, and lockup clutch 44. Control module, module, controller, control unit, electronic control unit, processor, and any permutations thereof, may be used interchangeably and synonymously to mean any one or various combinations of one or more of logic circuits, combinational logic circuit(s), Application Specific Integrated Circuit(s) (ASIC), electronic circuit(s), central processing unit(s) (e.g., microprocessor(s)), input/output circuit(s) and devices, appropriate signal conditioning and buffer circuitry, and other components to provide the described functionality, etc. Associated memory and storage (e.g., read only, programmable read only, random access, hard drive, tangible, etc.)), whether resident, remote or a combination of both, store processor-executable software and/or firmware programs or routines.

Software, firmware, programs, instructions, routines, code, algorithms, and similar terms may be used interchangeably and synonymously to mean any processor-executable instruction sets, including calibrations and look-up tables. The ECU 25 may be designed with a set of control routines executed to provide desired functions. Control routines are executed, such as by a central processing unit, and are operable to monitor inputs from sensing devices and other networked control modules, and execute control and diagnostic routines to govern operation of devices and actuators. Such inputs may include vehicle speed and acceleration data, vehicle turning and other dynamics data, sensor data, speed limit data, road gradient data, traffic flow data, geospatial data, road and lane-level data, etc. Routines may be executed in real-time, continuously, systematically, sporadically and/or at regular intervals, for example, each 100 microseconds, 3.125, 6.25, 12.5, 25 and 100 milliseconds, etc., during vehicle use. Alternatively, routines may be executed in response to occurrence of an event during operation of the vehicle 10.

Hydrokinetic torque converter assembly 18 of FIG. 1 operates as a fluid coupling for operatively connecting the engine 12 and motor 14 with the internal epicyclic gearing 24 of the power transmission 16. Disposed within an internal fluid chamber 29 of the TC assembly 18 is a bladed impeller 36 juxtaposed with a bladed turbine 38. The impeller 36 is packaged in facing spaced relation with the turbine 38, with a stator (FIG. 2) located between the impeller 36 and turbine 38 to selectively alter fluid flow therebetween. The transfer of engine torque from the crankshaft 13 to the transmission 16 via the TC assembly 18 is primarily through stirring excitation of hydraulic fluid, such as transmission oil, inside the TC's internal fluid chamber 29 caused by rotation of the turbine and impeller blades 33, 37. TC assembly 18 is constructed with a protective outer housing composed of an engine-side (front) turbine cover 40 sealingly attached to a transmission-side (rear) pump cover 42.

Figure 2:
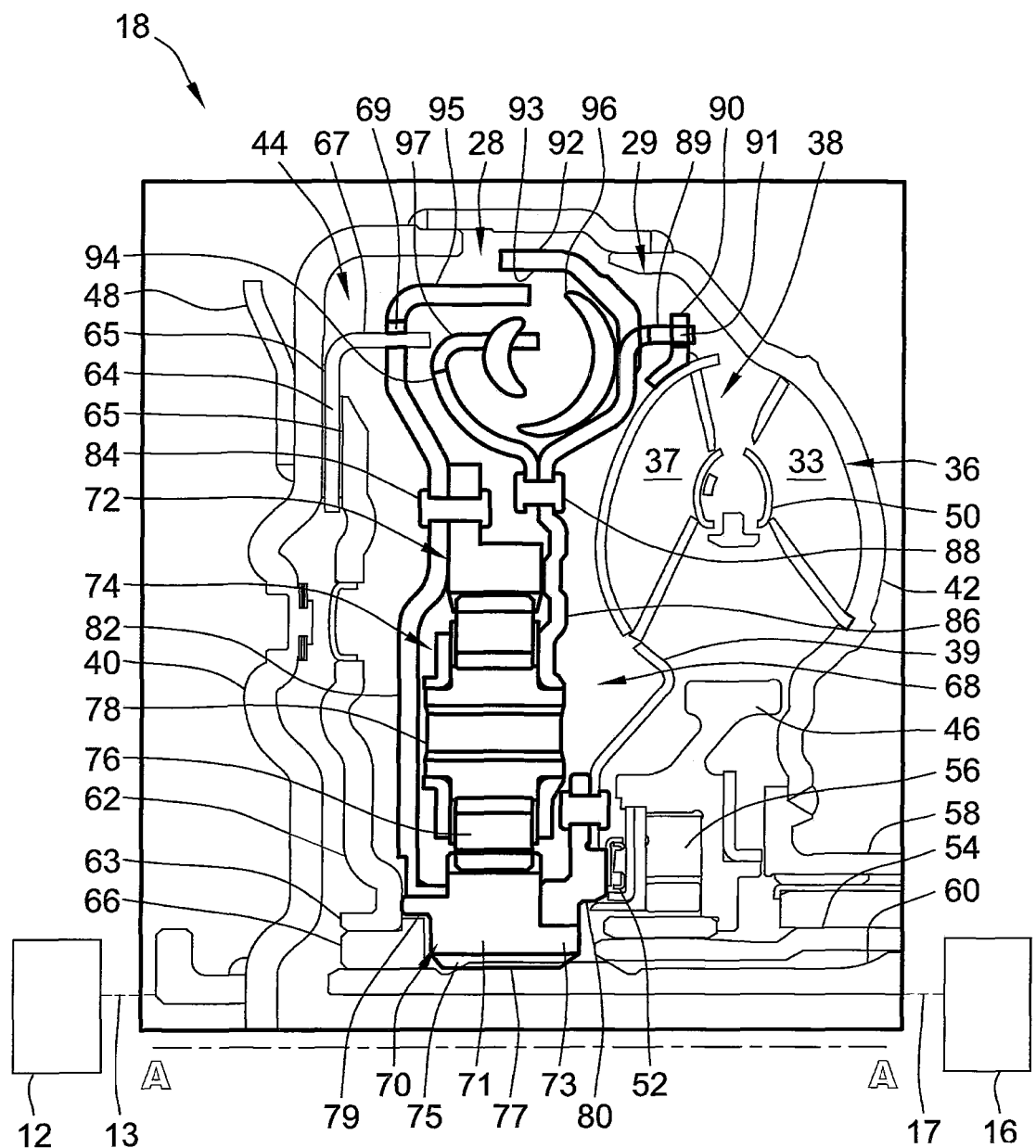
FIG. 2 is a partially schematic, sectional side-view illustration of select portions of a representative hydrodynamic torque converter assembly with an integrated planetary-type torsional vibration damper in accordance with aspects of the present disclosure.

FIG. 2 is a side-view illustration of an upper half of the representative torque converter assembly 18 of FIG. 1, taken in cross-section along a vertical plane that passes through the assembly's central axis of rotation A-A (cross-hatching omitted for ease of reference). It should be appreciated that a cross-sectional, side-view illustration of the lower half of the TC assembly 18 may be a near-identical mirrored image to that shown in FIG. 2. As described above, the torque converter 18 is assembled with an engine-driven impeller 36, an impeller-driven turbine 38, a fluid-flow altering stator 46, a torsional damper assembly 28, and a lockup clutch 44. To safeguard these components, the TC assembly 18 employs an annular protective outer housing that is defined principally by a front turbine cover 40 that is fixedly attached, e.g., via electron beam welding, MIG or MAG welding, laser welding, etc., to a rear pump cover 42 such that a working hydraulic fluid chamber 29 is formed therebetween. An engine flexplate (not shown) is connected to the TC housing's front cover 40, e.g., via a series of circumferentially spaced lugs and a lug plate 48. The front cover 40 drivingly connects by way of the engine flexplate and a crankshaft hub (also not shown) to the engine's crankshaft 13 such that rotational power is transferable back-and-forth between the engine 12 and TC assembly 18.

The impeller 36—also referred to in the art as "pump"—is situated in serial power-flow fluid communication with the turbine 38. Interposed between the impeller 36 and turbine 38 is a stator 46 that selectively alters fluid flow returning from the turbine 38 to the impeller 36 such that returning fluid aids, rather than impedes, rotation of the impeller 36. The transfer of engine torque from the crankshaft 13 to the turbine 38—via the TC housing 40, 42 and impeller 36—is through the manipulation of hydraulic fluid inside the fluid chamber 29. More specifically, rotation of circumferentially spaced impeller blades 33 that are mounted along an interior surface of the rear pump cover 42 causes the hydraulic fluid to flow forward (to the left in FIG. 2) and toroidally outward toward the turbine 38. When this occurs with sufficient force to overcome inertial resistance to rotation, turbine blades 37 juxtaposed and coaxially oriented with the impeller blades 33 begin to rotate with the impeller 36. These turbine blades 37 are circumferentially spaced about and mounted on a compliant turbine shell 39, which is located between the front cover 40 and an inner shroud 50. The fluid flow exiting the turbine 38 is directed back into the impeller 36 by way of the stator 46. The stator 46—located between the flow exit section of the turbine 38 and the flow entrance section of the impeller 36—redirects the fluid flow from the turbine 38 to the impeller 36 in the same direction as impeller rotation, thereby inducing torque multiplication.

Also disposed within the protective outer housing 40, 42 of the torque converter assembly 18 is a thrust bearing 52 that rotatably supports the stator 46 against the turbine 38. The stator 46 is connected to a hollow stator shaft 54 by way of a roller clutch 56 that is operable to prevent rotation of the stator 46 under calibrated operating conditions. At higher torque converter speeds, for example, the direction of hydraulic fluid leaving the turbine 38 changes, causing the stator 46 to over-run the roller clutch 56 and rotate freely on the stator shaft 54. The stator shaft 54 and a hollow turbine shaft ("TC output member") 60 are encased within a tubular pump hub 58, which secures the pump cover 42 to the transmission's bell housing. Roller clutch 56 is slidably attached, e.g., via splined engagement, for common rotation on the stator shaft 54, whereas the turbine shell 39 is rotatably mounted, e.g., via line-to-line sliding contact, on a sun gear 70 of the torsional damper assembly 28 and, thus, onto the turbine shaft 60. As shown, the pump hub 58 circumscribes the stator shaft 54 to cooperatively define therebetween a hydraulic fluid path, while a longitudinally elongated central hole of the turbine shaft 60 defines another hydraulic fluid path. These fluid paths are connected to a supply of hydraulic fluid, such as transmission oil sump 32, and independently modulated via a control module and pump, such as ECU 25 and transmission pump 34, to govern operation of the TC assembly 18.

Located inside the fluid chamber 29, coaxial with the damper 28 and turbine 38 on turbine shaft 60, is a TC lockup clutch 44 that provides a direct driving connection between the engine 12 and transmission 16 under system-calibrated operating conditions. In accord with the illustrated architecture, this TC lockup clutch 44 is sandwiched between the TC housing's front cover 40 and the damper assembly 28 at the forward end of the TC assembly 18. The lockup clutch 44 is a bipartite device composed of a disk-shaped pressure plate 62 immediately adjacent a ring-shaped friction plate 64. Both fore and aft faces of the representative friction plate 64 of FIG. 2 carry friction material 65 that generate kinetic frictional forces on respective facially opposing engagement surfaces of the turbine cover 40 and pressure plate 62. The pressure plate 62 is axially slidable, e.g., via line-to-line contact of clutch hub 63 with bushing 66, on a proximal end of the turbine shaft 60. Pressure plate 62 functions as a hydraulic piston that slides in a fore-aft (left-right in FIG. 2) reciprocating motion responsive to pressurized fluid fed into fluid chamber 29 from a fluid source, such as sump volume 32 of FIG. 1. The lockup clutch 44 is fully engaged when the friction material 65 is compressed against the front cover 40 and pressure plate 62 such that there is substantially no slip between the pressure plate 62, friction plate 64, and TC housing 40, 42. In so doing, the TC housing 40, 42 is rotatably locked to the turbine shaft 60 via the damper assembly 28, as described below, such that the two components rotate as a single unit. TC lockup allows the engine 12 to effectively circumvent the torque converter assembly 18 and transmit power directly to the transmission 16 without any efficiency losses associated with operation of the impeller-to-turbine fluid coupling.

Fundamentally, as the internal combustion engine 12 operates at different rotational speeds it may produce torsional vibrations (colloquially known as "torsionals"). By way of example, when fuel is being fed to the engine 12 and it is generating power, e.g., through engagement of a fuel throttle (not shown) during normal operation of the vehicle 10, the engine 12 may produce torsionals that are undesirable to transmit to and through the transmission 16. In addition, when the engine 12 is not being fueled and, thus, is not powered (e.g., in a startup and/or a shutdown operation), the engine pistons may generate compression pulses. Both the torsionals and compression pulses can produce resultant vibrations and noise that may be sensed by a vehicle occupant. To cancel out the torsionals and compression pulses that may be produced by the engine 12, the torque converter assembly 18 is equipped with a torsional damper assembly 28 located between the turbine shell 39 and front turbine cover 40. This torsional damper assembly 28 may generally function to isolate the transmission 16 from unwanted torsionals generated during operation of the engine 12 and also to selectively aide the MGU 14 in canceling engine compression pulses during engine startup and shutdown operations.

With continuing reference to FIG. 2, damper assembly 28 is coupled between the TC clutch 44 and the turbine shaft 60 in order to reduce torsional vibration in a path between the engine 12 and transmission 16 when the torque converter's lockup clutch 44 is closed and carrying torque. Moreover, the torsional vibration damper assembly 28 is coupled between the turbine 38 and turbine shaft 60 to provide a load path for carrying torque from the turbine 38 to the TC's output shaft 60. To increase the effective range of torsional vibration isolation and damping, the damper assembly 28 is furnished with a planetary gear set (PGS) 68, which is represented herein by a central sun gear 70, an outermost ring gear 72, and an intermediate planet carrier 74. Rotatably mounted on the planet carrier 74, e.g., via pinion tilt pins 78, are a series of circumferentially spaced pinion gears 76 that are radially interposed between and intermeshed with the sun and ring gears 70, 72. The sun gear 70, ring gear 72, and planet carrier 74 are mutually coaxial, with the ring gear 72 concentrically surrounding the sun gear 70. While shown as a single-stage, passive epicyclic gear arrangement, it is envisioned that the PGS 68 may comprise multi-stage, compound, and/or active gear train configurations.

The sun gear 70 is concentric with and securely attached directly to the TC's output member 60 for common rotation therewith. Unlike other commercially available planetary-type torsional vibration dampers, the sun gear 70 lacks an integrally formed coupling with either or both the turbine shell 39 and turbine hub 80. As shown, the sun gear 70 is fabricated with an annular body 71 and a toroidal hub 73 that projects axially from the annular body 71, e.g., in an aft direction towards the transmission 16. Extending radially inward from a central through hole of the sun gear 70 are circumferentially spaced internal "female" spline teeth 75. In the same vein, circumferentially spaced external "male" spline teeth 77 project radially outward from a select segment of the turbine shaft 60. The sun gear's spline teeth 75 intermesh with the turbine shaft's spline teeth 77 to thereby rotatably lock the sun gear 70 to the turbine shaft 60. Comparatively, the turbine hub 80 and, thus, the turbine shall 39 and blades 37 freely rotate via line-to-line sliding contact onto the toroidal hub 73 of the sun gear 70. With this arrangement, the turbine hub 80 circumscribes the sun gear's toroidal hub 73, trapped between a transmission-side axial face of the sun gear body 71 and the thrust bearing 52 seated against an engine-side axial face of the stator's roller clutch 56.

Driving engagement between the TC lockup clutch 44 and torsional damper assembly 28 is made by way of the ring gear 72, whereas driving engagement between the bladed turbine 38 and damper assembly 28 is made by way of the planet carrier 74. Ring gear 72, which is coaxially aligned with both the pressure plate 62 and friction plate 64, is securely attached to the TC clutch 44 for common rotation therewith. Secured attachment between the ring gear 72 and clutch 44 may be achieved by way of a disk-shaped ring drive plate 82 that is rotatably and slidably mounted onto a mounting ring 79 that projects axially from the sun gear's annular body 71. The ring drive plate 82 is rigidly coupled to the ring gear 72, e.g., via rivet 84, and is mechanically coupled to the friction plate 64, e.g., via axially projecting tang 67 seated inside radial cutout 69, such that the friction plate 64, ring gear 72, and drive plate 82 rotate in unison with each other. It should be appreciated that mechanical engagement between the interconnected elements illustrated in FIG. 2 may be provided by the same, similar, or any suitable connection means, including rivets, fasteners, welding, integral forming, etc.

Coaxially aligned with both the impeller 36 and turbine 38 is a planet carrier 74 that is securely attached to the turbine blades 37 for common rotation therewith. Secured attachment between the carrier 74 and turbine 38 may be achieved by way of a disk-shaped carrier drive plate 86 that is integrally formed, as a single-piece structure, with the planet carrier 74. An adapter ring 90 is seated flush against and projects radially outward from an outer diameter surface of the turbine shell 39. This adapter ring 90, which is welded, fastened, or otherwise rigidly attached to the turbine shell 39, is fabricated with one or more slots 91 (e.g., eight (8) equidistantly spaced slots) that extend through the adapter ring 90. One or more carrier tabs 89 (e.g., eight (8) equidistantly spaced tabs) project axially from the carrier drive plate 86 towards the rear pump cover 42. Each tab 89 extends into and, optionally, through a respective slot 91 in the adapter ring 90 to thereby drivingly couple the planet carrier 74 to the turbine shell 39. In so doing, the turbine 38, planet carrier 74, and drive plate 86 rotate in unison with each other.

To provide isolation and mitigation of engine-generated torsional vibrations during TC lockup, the torsional damper assembly 28 includes an annular damper flange 92 that cooperates with a spring retainer 94 to operatively support one or more spring-mass damper systems, referred to hereinafter as "SDS" and identified at 96. According to the representative architecture of FIG. 2, the damper flange 92 projects radially outward from a distal end of the carrier drive plate 86, whereas the spring retainer 94 is rigidly attached, e.g., via rivets 88, to an engine-facing axial face of the drive plate 86. The damper flange 92 and spring retainer 94 cooperatively define a series of circumferentially spaced spring pockets 93, each of which nests therein a respective SDS 96. Each SDS 96 may comprise a helical compression spring or other suitable spring element that is sandwiched between a pair of weighted end caps. A spring tang 95 projects axially from a radially outer end of the ring drive plate 82 and presses against a first longitudinal end of the SDS 96. In the same vein, a spring retainer tab 97 projects axially from a radially outer end of the spring retainer 94 and presses against a second longitudinal end of the SDS 96 opposite that of the spring tang 95. By this means, the SDS 96 mate the spring retainer 94 and, thus, the drive plate 86 and planet carrier 74 with the TC friction plate 64 and ring gear 72. This allows for spring-biased rotational play between the two drive plates 82 and 86, including the components coupled thereto.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. A motor vehicle, comprising:
a vehicle body;
a plurality of road wheels attached to the vehicle body;
an engine assembly attached to the vehicle body and configured to generate torque;
a power transmission attached to the vehicle body and drivingly connecting the engine assembly to one or more of the road wheels to thereby propel the motor vehicle; and
a torque converter (TC) assembly attached to the vehicle body and drivingly connecting the engine assembly with the power transmission, the TC assembly comprising:
a TC housing defining therein a fluid chamber and drivingly connected to the engine assembly to receive torque output therefrom;
a TC output member rotatable with respect to the TC housing and drivingly connected to the transmission to transfer torque thereto;
a turbine including a turbine shell, turbine blades mounted to the turbine shell and rotatable within the fluid chamber, and an adapter ring projecting radially outward from the turbine shell, the adapter ring defining a slot;

an impeller including impeller blades juxtaposed with the turbine blades and rotatable within the fluid chamber;

a TC clutch operable to lock the TC housing to the TC output member; and a torsional vibration damper disposed within the fluid chamber adjacent the turbine and the TC clutch, the torsional vibration damper including:

a sun gear attached to the TC output member to rotate in unison therewith;

a ring gear coaxial with the sun gear and attached to the TC clutch to rotate in unison therewith;

a planet carrier with a pinion gear intermeshed with the ring and sun gears; and a drive plate attached to the planet carrier and including a tab projecting axially from the drive plate into the slot of the adapter ring to thereby drivingly couple the planet carrier to the turbine blades to rotate in unison therewith.

2. The motor vehicle of claim 1, wherein the adapter ring is welded onto an outer surface of the turbine shell.

3. The motor vehicle of claim 1, wherein the slot includes a plurality of circumferentially spaced slots extending through the adapter ring, and the tab includes a plurality of circumferentially spaced carrier tabs each projecting axially from the drive plate into a respective one of the slots in the adapter ring.

4. The motor vehicle of claim 1, wherein the sun gear includes an annular body with a toroidal hub projecting axially from the annular body, and wherein the turbine further includes a turbine hub attached to the turbine shell and rotatably seated onto the toroidal hub of the sun gear.

5. The motor vehicle of claim 1, wherein the TC clutch includes a TC friction plate, and wherein the torsional vibration damper further includes a spring retainer and a spring element, the spring retainer mounted to the drive plate, and the spring element mating the spring retainer with the TC friction plate such that the planet carrier is movably attached to the TC clutch.

6. The motor vehicle of claim 5, wherein the spring retainer includes a plurality of circumferentially spaced spring pockets, and the spring element includes a plurality of helical compression springs each disposed within a respective one of the spring pockets.

7. The motor vehicle of claim 1, wherein the TC clutch includes a TC friction plate, and wherein the torsional vibration damper further includes a ring drive plate coupling the ring gear to the friction plate for common rotation therewith.

8. The motor vehicle of claim 7, wherein the TC clutch further includes a pressure plate axially slidable along the TC output member and operable, under hydraulic pressure of fluid within the fluid chamber, to frictionally engage the friction plate with the TC housing to thereby lock the TC housing to the TC output member.

9. The motor vehicle of claim 8, wherein the torsional vibration damper further includes a spring retainer and a spring element, the spring retainer mounted to the drive plate, and the spring element mating the spring retainer with the TC friction plate such that the planet carrier is movably attached to the TC clutch and the ring gear.

10. The motor vehicle of claim 1, wherein the ring gear is concentric with the sun gear and the planet carrier.

11. The motor vehicle of claim 1, wherein the TC output member includes a turbine shaft with external spline teeth, and wherein the sun gear includes a central through hole with internal spline teeth intermeshed with the external spline teeth of the turbine shaft.

12. The motor vehicle of claim 1, wherein the engine includes an engine crankshaft, and wherein the TC housing includes a turbine cover rigidly attached to a pump cover to define therebetween the fluid chamber, the turbine cover being rigidly attached to the engine crankshaft.

13. A motor vehicle, comprising:

a vehicle body;

a plurality of road wheels attached to the vehicle body;

an engine assembly attached to the vehicle body and configured to generate torque;

a power transmission attached to the vehicle body and drivingly connecting the engine assembly to one or more of the road wheels to thereby propel the motor vehicle; and a torque converter (TC) assembly attached to the vehicle body and drivingly connecting the engine assembly with the power transmission, the TC assembly comprising:

a TC housing defining therein a fluid chamber and drivingly connected to the engine assembly to receive torque output therefrom;

a TC output member rotatable with respect to the TC housing and drivingly connected to the transmission to transfer torque thereto;

a turbine including a turbine shell, turbine blades mounted to the turbine shell and rotatable within the fluid chamber, and a turbine hub attached to the turbine shell;

an impeller including impeller blades juxtaposed with the turbine blades and rotatable within the fluid chamber;

a TC clutch operable to lock the TC housing to the TC output member; and a torsional vibration damper disposed within the fluid chamber adjacent the turbine and the TC clutch, the torsional vibration damper including:

a sun gear attached to the TC output member to rotate in unison therewith, the sun gear including an annular body with a toroidal hub projecting axially from the annular body and seating thereon the turbine hub of the turbine;

a ring gear coaxial with the sun gear and attached to the TC clutch to rotate in unison therewith; and a planet carrier with a pinion gear intermeshed with the ring and sun gears.

14. The motor vehicle of claim 13, wherein the torsional vibration damper further includes a drive plate coupling the planet carrier to the turbine shell.

15. The motor vehicle of claim 14, wherein the turbine further includes an adapter ring projecting outward from the turbine shell and defining a slot, and the drive plate includes a tab, and wherein coupling the planet carrier to the turbine shell includes the tab projecting from the drive plate into the slot of the adapter ring.

16. The motor vehicle of claim 15, wherein the slot includes a plurality of circumferentially spaced slots extending through the adapter ring, and the tab includes a plurality of circumferentially spaced carrier tabs each projecting axially from the drive plate into a respective one of the slots of the adapter ring.

17. The motor vehicle of claim 15, wherein the TC clutch includes a TC friction plate, and wherein the torsional vibration damper further includes a spring retainer and a spring element, the spring retainer mounted to the drive plate, and the spring element mating the spring retainer with the TC friction plate such that the planet carrier is movably attached to the TC clutch and the ring gear.

18. The motor vehicle of claim 15, wherein the adapter ring is welded onto an outer surface of the turbine shell.

19. The motor vehicle of claim 13, wherein the ring gear is concentric with the sun gear and the planet carrier.

20. The motor vehicle of claim 13, wherein the TC clutch includes a TC friction plate, and wherein the torsional vibration damper further includes a ring drive plate coupling the ring gear to the friction plate for common rotation therewith.

\* \* \* \* \*